United States Patent

Shyu et al.

[11] Patent Number: 6,028,974
[45] Date of Patent: Feb. 22, 2000

[54] SEAL FOR UNDERWATER CABLE JOINT

[75] Inventors: Shyi-Hwang Shyu, Vancouver, Wash.; Richard Karl Jones, Beaver, Oreg.

[73] Assignee: Alcatel, Paris, France

[21] Appl. No.: 09/131,645

[22] Filed: Aug. 10, 1998

[51] Int. Cl.⁷ .................................................. G02B 6/44
[52] U.S. Cl. ...................... 385/100; 385/134; 385/110; 385/135
[58] Field of Search ..................... 385/100–114, 134–140

[56] References Cited

U.S. PATENT DOCUMENTS 4,773,729   9/1988   Mignien .................................. 385/135

OTHER PUBLICATIONS

*Hydrogen Transport In Austenitic Stainless Steel* by M.R. Louthan, Jr., and R.G. Derrick, *Corrosion Science*, 1975, vol. 15, pp. 565–577.
*Vacuum Sealing Techniques* by A. Roth, Copyright 1994 by American Institute of Physics, pp. 427–437.
*Working Strength of Bolts, Machinery's Handbook*, 1990, 23rd Ed., 4th printing by Industrial Press, Inc., pp. 1278–1279.

*Primary Examiner*—Phan T. H. Palmer
*Attorney, Agent, or Firm*—Ware, Fressola, Van Der Sluys & Adolphson LLP

[57] ABSTRACT

A cable junction is provided for connecting two optical cables (110) submerged underwater, having a casing (130), an anchorage (120), a casing loading ring (150), an anchorage loading ring (145) and a seal ring (140). The casing (130) has a casing sealing surface (153). The anchorage (120) is arranged in the casing (130), and has an anchorage sealing surface (157). Circular ridges (260, 263) are provided in the casing sealing surface (153) and the anchorage sealing surface (157), respectively, for embedding into the seal ring (140). The anchorage (120) is rotatably coupled to the casing (130) by an anchorage/casing threaded joint (133). The casing loading ring (150) has a casing loading ring sealing surface (150a). The anchorage loading ring (145) has an anchorage loading ring sealing surface (145a). The seal ring (140) is arranged between the casing sealing surface (153) and the casing loading ring sealing surface (150a), and also arranged between the anchorage sealing surface (157) and the anchorage loading ring sealing surface (145a) for preventing hydrogen from entering the cable junction. The seal ring (140) is preferably made from a metal material such as copper, however, the scope of the invention is not intended to be limited to any particular material.

7 Claims, 7 Drawing Sheets

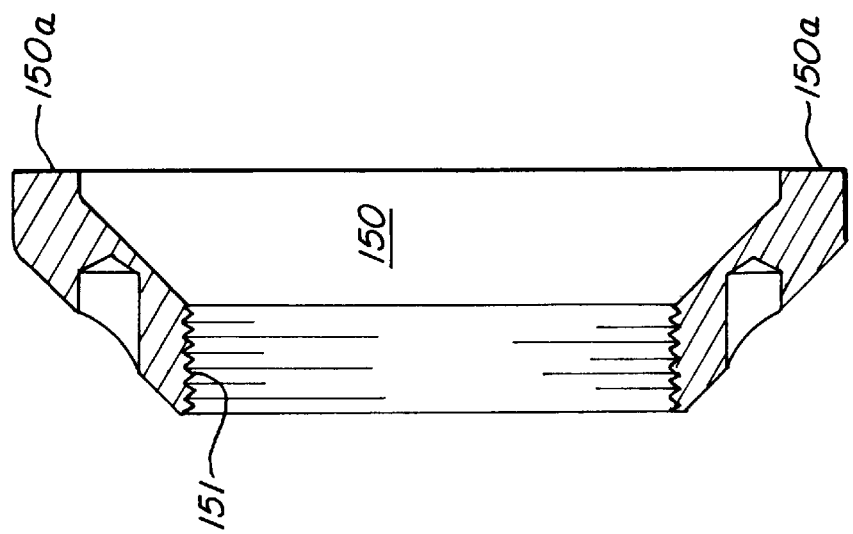
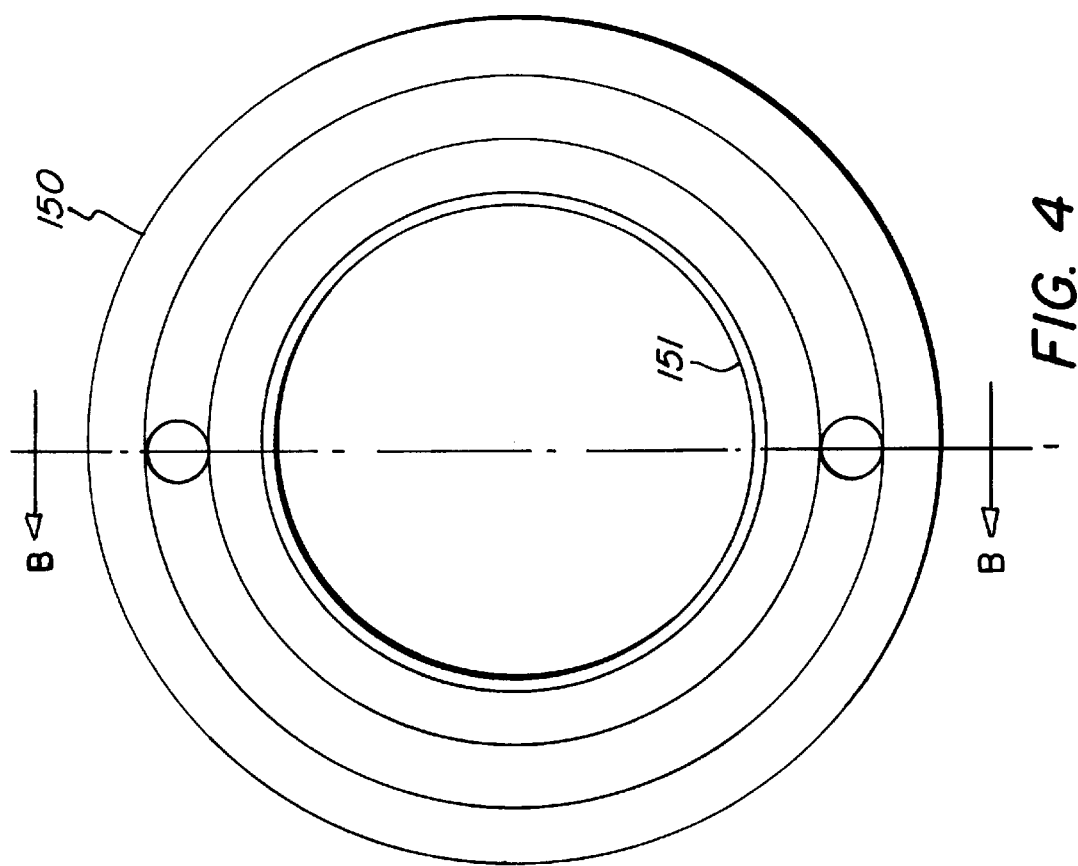

SEAL FOR UNDERWATER CABLE JOINT

BACKGROUND OF THE INVENTION

1. Field of the Invention

The present invention relates generally to an apparatus which provides a seal between two surfaces, and specifically to an apparatus which seals the ends of two optical fiber cables inside a casing to prevent damage to optical fibers and optical attenuation when the casing is submerged in water and exposed to hydrogen. The present invention is directed at providing a seal at an end of the casing.

2. Description of the Prior Art

In the prior art, submarine optical cable junctions are known for connecting two cables underwater. In such a submarine optical cable junction, optical fibers from one cable are physically connected to optical fibers of another cable, disposed underwater, and subjected to water pressure in excess of 10,150 pounds per square inch.

In view of this, the submarine optical cable junction typically suffers from problems caused by hydrogen entering into the cable junction that adversely affects the optical fibers in the two cables that are exposed in the cable junction. The hydrogen is generated near the cable junction from galvanic corrosion of metal parts, magnetohydrodynamic effects, and microbial activity near the cable junction. The hydrogen causes optical loss in the optical fiber, which is known in the art as hydrogen induced attenuation. If hydrogen penetrates a significant distance along the optical fibers, then the hydrogen causes a significant amount of hydrogen induced attenuation in the optical fiber.

FIG. 1 shows one end of a prior art cable junction generally indicated as 8 having a cable 10 sealed inside a tubular stainless steel casing 12. The cable 10 is connected to another cable similarly sealed inside the casing 12 but not shown in FIG. 1. The cable junction 8 is substantially symmetrical, and for the purpose of this discussion only one end is shown and described herein. The cable 10 typically has a capillary tube 16 which contains a water-blocking compound therein. The water-blocking compound may contain a hydrogen-absorbing compound, which may delay the onset of hydrogen induced attenuation depending upon the absorption capacity of the compound, the degree to which the compound fills the capillary tube 16, and the applied hydrogen pressure. However, hydrogen inevitably enters the capillary tube 16.

The cable 10 comprises a protective sheath 14, a power conductor 15, a capillary tube 16, within which are housed the optical fibers (not shown), and strength members 17. The cable 10 is secured to the anchorage 20 by clamping the strength members 17 to the anchorage 20 via a ferrule 22, a retaining washer 23, and a retaining nut 24. The mounting block 21 provides support for the capillary tube 16. The mounting block 21 is held against the anchorage 20 by stopper screws 31. The anchorage 20 is in turn fixed relative to the casing 12 via the anchorage/casing threaded joint 33 and the loading ring 38. The loading ring 38 is threaded on the anchorage 20 by engaging a torque wrench (not shown) in blind holes 38a, for turning the loading ring 38 on the threads 85.

To secure the cable 10 to the anchorage 20, the protective sheath 14 is removed from the cable 10 to expose the power conductor 15. A compression body 26 and a sleeve portion 27 are compressed against the power conductor 15 and the anchorage 20 by threaded cap nut 28 to secure cable 10 to anchorage 20.

The prior art suffers from problems related to hydrogen entering into the cable junction 8. One such problem is that the anchorage/casing threaded joint 33 does not provide an effective seal with regard to hydrogen. Therefore, hydrogen can leak into the casing 12 between the casing 12 and the loading ring 38 at a junction generally indicated as "A" in FIG. 1. In addition, hydrogen can leak into the casing 12 between the anchorage 20 and the loading ring 38 at a junction generally indicated as "B" in FIG. 1. Furthermore, there is no sealing member between the tubular stainless steel casing 12 and the loading ring 38 at the junction A.

SUMMARY OF THE INVENTION

Accordingly, the present invention provides a cable junction featuring a seal between a casing and an anchorage that prevents hydrogen from entering the casing. The invention includes a combination of an anchorage/casing seal ring, an anchorage loading ring, and a casing loading ring. The anchorage loading ring compresses one part of the anchorage/casing seal ring against a sealing surface of the anchorage. The casing loading ring compresses another part of the anchorage/casing seal ring against a sealing surface of the casing. The sealing surface of the anchorage has a circular anchorage ridge, and the sealing surface of the casing has a circular casing ridge, both ridges being embedded into the anchorage/casing seal ring when properly assembled.

One important advantage of the invention is that the seal prevents hydrogen from entering between the anchorage and the casing, and reduces the undesirable affects caused by hydrogen induced attenuation in the optical fiber.

The foregoing object of the present invention is realized by the seal of the present invention which generally comprises two loading rings and a seal ring.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include:

FIG. 4 depicts the casing loading ring 150 shown in FIG. 2,

FIG. 4S is a cross-sectional view of the casing loading ring 150 taken along line B—B in FIG. 4;

DETAILED DESCRIPTION OF THE INVENTION

Figure 1:
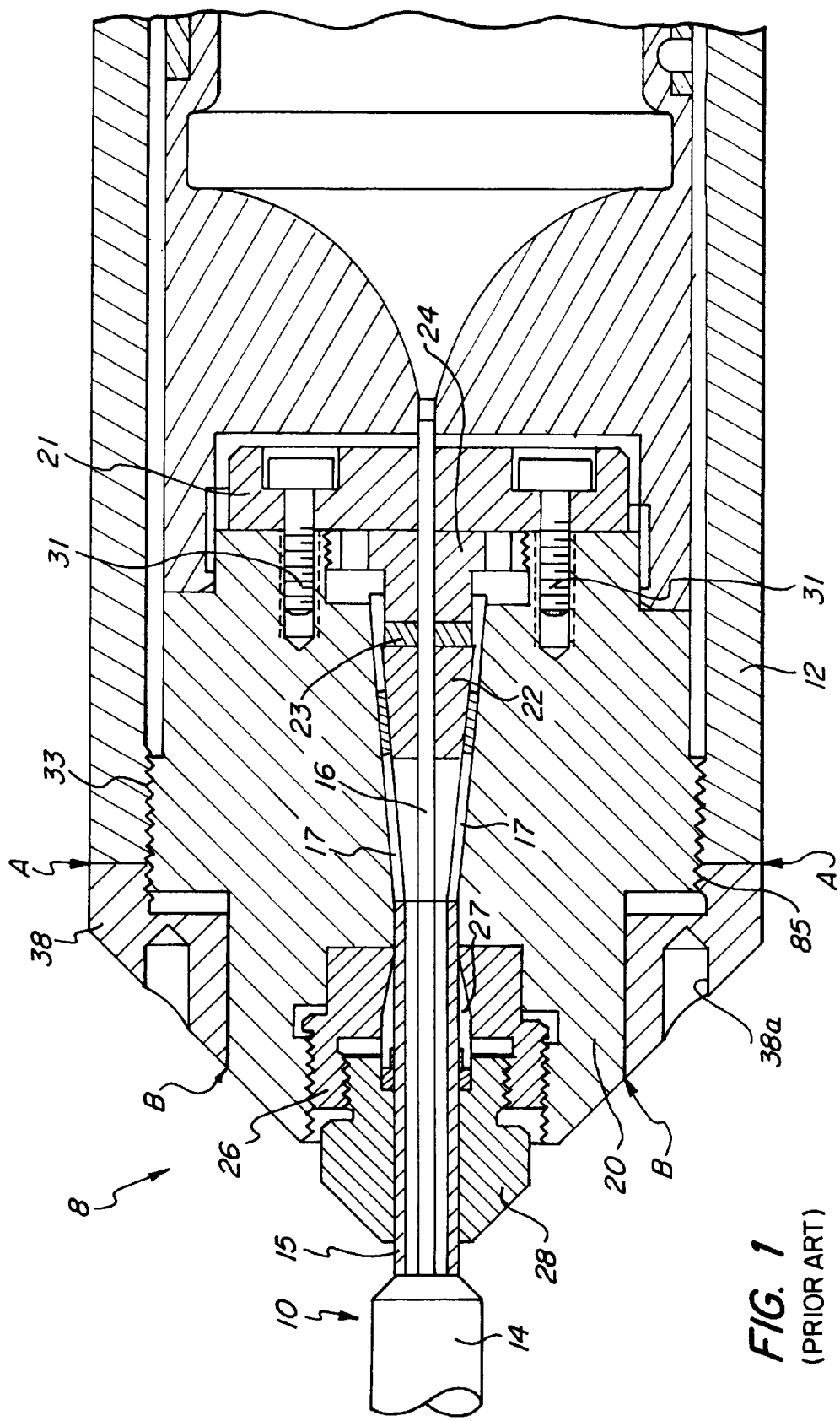
FIG. 1 is a cross-sectional view of one end of a prior art cable junction.
Figure 2:
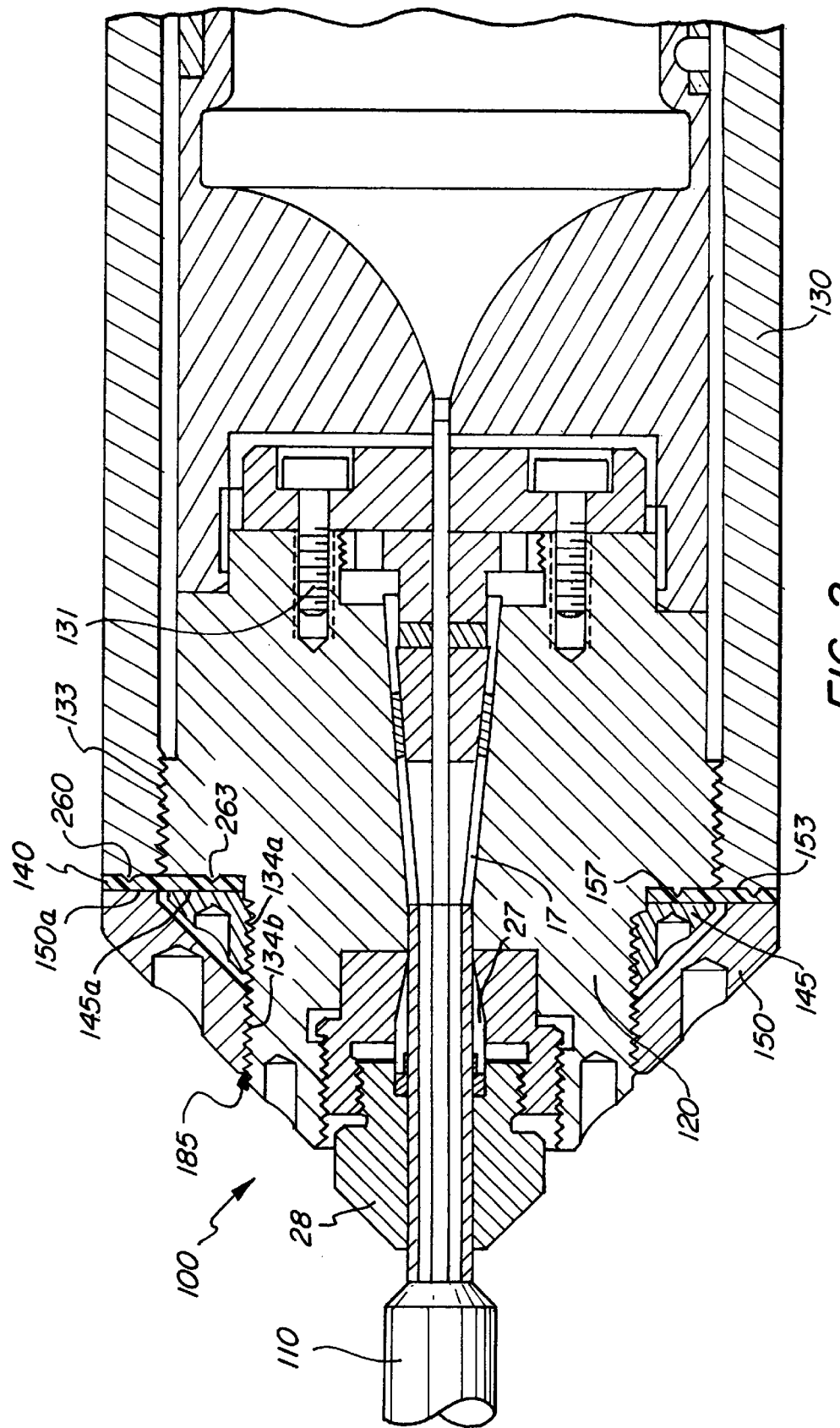
FIG. 2 is a cross-sectional view of one end of a cable junction according to the present invention.

FIG. 2 shows a cable junction 100 that is the subject of the present invention for connecting two optical cables that will be submerged underwater, one cable is indicated as 110. The cable junction 100 is similar to the cable junction 8 in FIG. 1 in many ways. The following discussion focuses on the differences between FIG. 1 and FIG. 2, with respect to the anchorage/casing joint that is the point of novelty of the invention.

In FIG. 2, the cable junction 100 has a casing 130, an anchorage 120, a casing loading ring 150, an anchorage loading ring 145 and a seal ring 140. The casing 130 has a casing sealing surface 153. The casing sealing surface 153 includes a casing circular ridge 260. The anchorage 120 is arranged in the casing 130, and has an anchorage sealing surface 157. The anchorage sealing surface 157 includes an anchorage circular ridge 263. The anchorage 120 is rotatably coupled to the casing 130 by an anchorage/casing threaded joint 133. The casing loading ring 150 has a casing loading ring sealing surface 150a. The anchorage loading ring 145 has an anchorage loading ring sealing surface 145a. The seal ring 140 is arranged between the casing sealing surface 153 and the casing loading ring sealing surface 150a, and also arranged between the anchorage sealing surface 157 and the anchorage loading ring sealing surface 145a for preventing hydrogen from entering the cable junction 100. The seal ring 140 is preferably made from a metal material such as copper however, the scope of the invention is not intended to be limited to any particular material. Annealed copper (UNS 10200) is an appropriate choice for the seal ring 140.

As shown, the anchorage loading ring 145 is rotatably coupled to the anchorage 120 by an anchorage loading ring threaded joint 134a for sealably compressing the seal ring 140 between the anchorage sealing surface 157 and the anchorage loading ring sealing surface 145a. The casing loading ring 150 is rotatably coupled to the anchorage 120 by the casing loading ring threaded joint 134b for sealably compressing the seal ring 140 between the casing sealing surface 153 and the casing loading ring sealing surface 150a for preventing hydrogen from entering the cable junction 100.

Figure 3S:
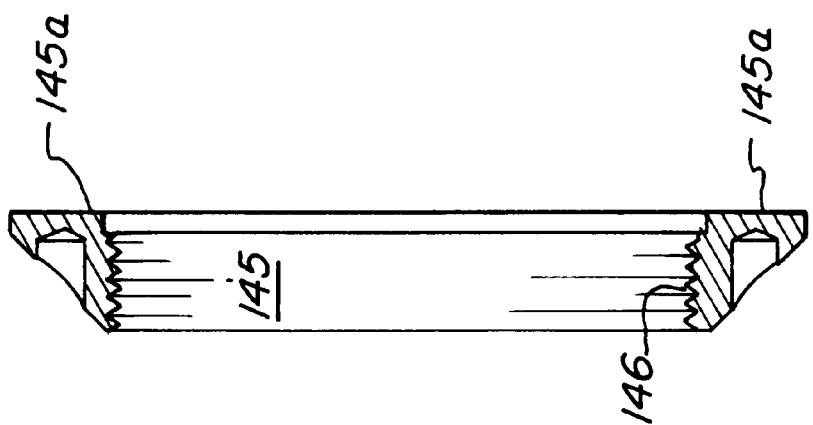
FIG. 3S is a cross-sectional view of the anchorage loading ring 145 taken along line A—A in FIG. 3.

The cable junction 100 according to the present invention is formed as follows. The anchorage 120 is attached to the casing 130 by engaging the threads of the casing 130 and the threads of the anchorage 120 to form the anchorage/casing threaded joint 133. Next, the seal ring 140 is placed around the anchorage 120 and against the sealing surfaces 153, 157. Anchorage loading ring 145 is then threaded onto the anchorage 120 by engaging the loading ring threads 185 with the threads 146 (shown in FIGS. 3 and 3S) of the anchorage loading ring 145 until the anchorage loading ring 145 compresses the seal ring 140 firmly against anchorage sealing surface 157 such that the circular ridge 263 is fully embedded in the seal ring 140. Finally, the casing loading ring 150 is threaded onto the anchorage 120 by engaging the loading ring threads 185 with the threads 151 (shown in FIGS. 4 and 4S) of the casing loading ring 150 until the casing loading ring 150 compresses the seal ring 140 firmly against the casing sealing surface 153 such that the circular ridge 260 is fully embedded in the seal ring 140.

In FIG. 2, the anchorage sealing surface 157 is shown in line with the casing sealing surface 153 so that when the seal ring 140 is installed, the seal ring major surfaces 187 (discussed below and shown in FIGS. 5 and 6) remain substantially flat. However, the scope of the invention is not intended to be limited to the sealing surfaces 153, 157 being in line with each other.

Figure 3:
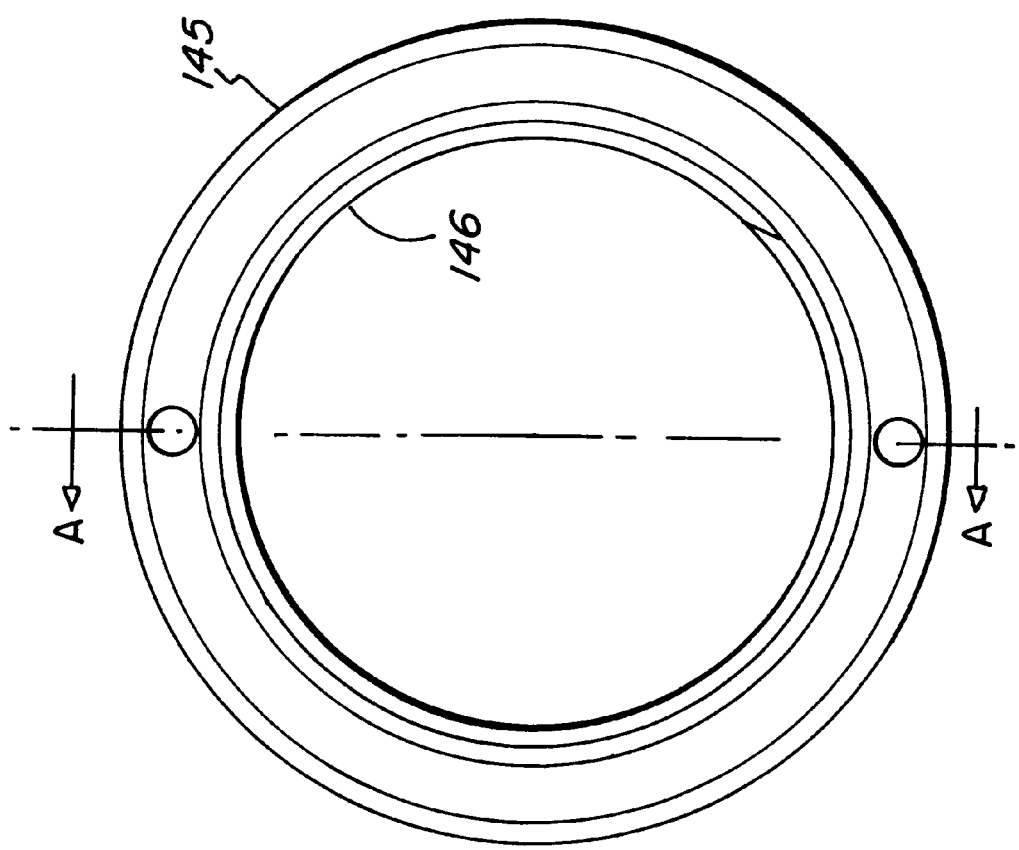
FIG. 3 depicts the anchorage loading ring 145 shown in FIG. 2.

FIG. 3 shows the anchorage loading ring 145. Also shown are the anchorage loading ring threads 146 for engaging the loading ring threads 185 of the anchorage 120.

FIG. 4 shows the casing loading ring 150. Also shown are the casing loading ring threads 151 for engaging the loading ring threads 185 of the anchorage 120.

Figure 5:
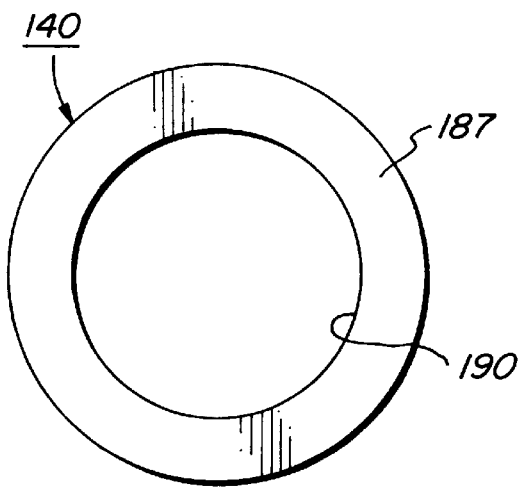
FIG. 5 depicts the seal ring 140 shown in FIG. 2.
Figure 6:
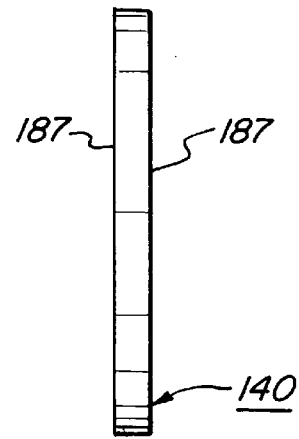
FIG. 6 is a side view of the seal ring 140 shown in FIG. 5.

FIGS. 5 and 6 show the seal ring 140 having opposing flat major surfaces 187 and an aperture 190 for permitting the seal ring 140 to be placed around the anchorage 120. The aperture 190 is large enough to permit the seal ring 140 to slide over the loading ring threads 185. The seal ring 140 is preferably made from a metal comprising copper.

Figure 7:
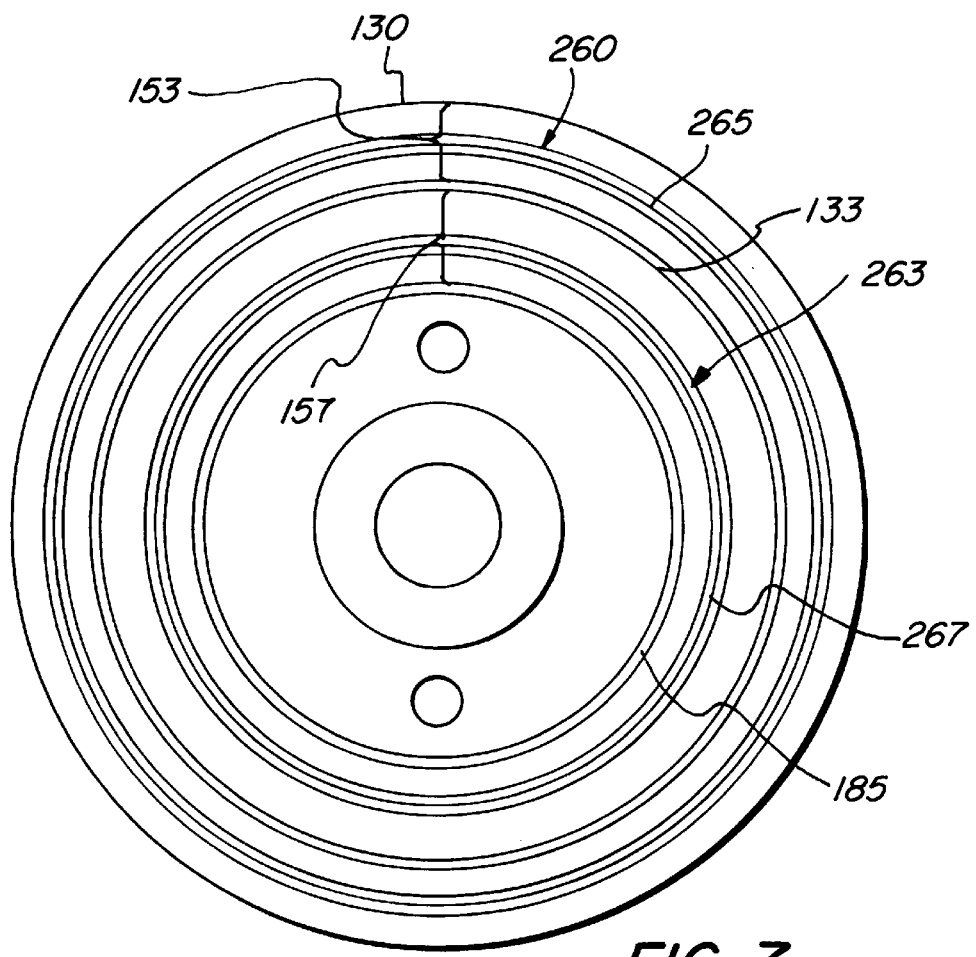
FIG. 7 is an end view of the casing with the anchorage installed therein according to the present invention.

FIG. 7 shows the casing sealing surface 153 and the anchorage sealing surface 157 in more detail. FIG. 7 shows the casing circular ridge 260, which has a sharp leading edge 265, and also shows the anchorage circular ridge 263, which has a sharp leading edge 267, both ridges 260, 263 for embedding into the seal ring 140. It is estimated that an embodiment of the cable junction 100 for an optical fiber cable 110 having a diameter of 14 mm will require a load of approximately 180 kN to properly embed the circular ridges 260, 263 having sharp leading edge 265 or 267 in the seal ring 140. To properly apply this force and thereby properly embed the circular ridges 260, 263 in the seal ring 140, it may be necessary to apply an external load, with a press machine for example, to initially embed the circular ridges 260, 263 into the seal ring 140. The loading rings 145, 150 would then be tightened to generate a sufficient load to maintain the seal.

Figure 8:
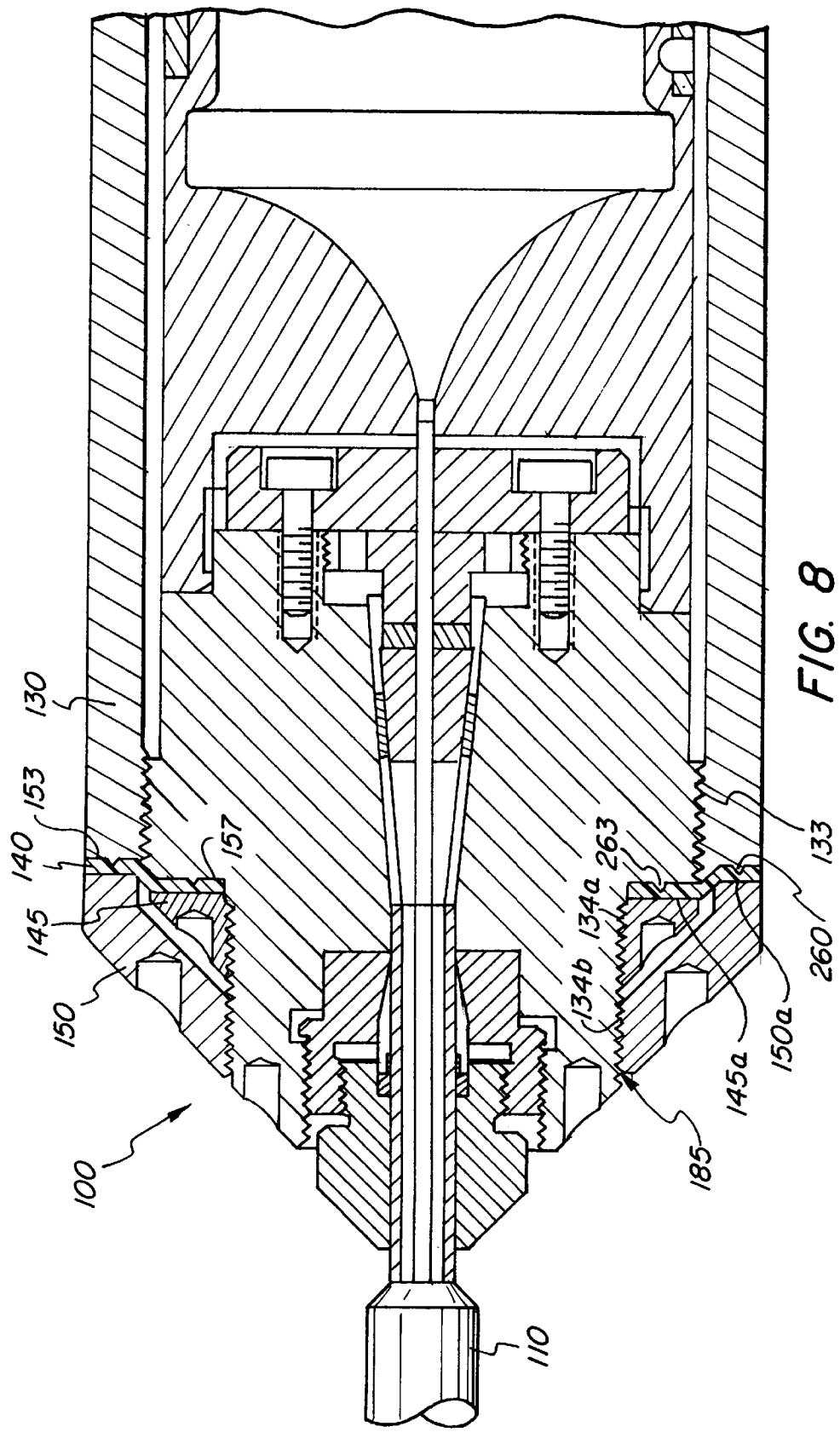
FIG. 8 is a cross-sectional view of one end of a cable junction according to the present invention where the anchorage sealing surface 157 and the casing sealing surface 153 are not in line with one another.

FIG. 8 shows an embodiment of the present invention where the sealing surfaces 153, 157 are not in line with each other. In such an embodiment, the seal ring 140 deforms under the force applied by the press machine so that the major surfaces 187 of the seal ring 140 are not flat. The ability to seal the anchorage/casing joint when the sealing surfaces 153, 157 are not in line with each other is particularly important since the casing 130 and anchorage 120 are not often in alignment, and bringing them into alignment is difficult.

It should be apparent to those skilled in the art that if the cable 110 is placed in tension, the anchorage 120 and the casing 130 will strain together thereby maintaining the seal established by the present invention. In addition, the position of the circular ridge 260 with respect to the seal ring 140 is not affected by applying tension to cable 110 since seal ring 140 is not in the load transfer path.

Finally, it should be noted that the preferred material for the casing 130 and the loading rings 145, 150 is Z6 CND 16-04-01 (AFNOR). A suitable material for the casing is BS 970 431S29 (SAE/AISI 431).

EXAMPLE ANALYSIS

As previously described, the seal must be capable of accommodating variation in the relative position of the anchorage 120 and the casing 130. In the joint 100 for a 14 mm cable, a 1/16" thick copper seal ring 140 is placed over the two sharp leading edges 265, 267 and deformed on to the sealing surfaces 153, 157 by the loading rings 145, 150 screwed onto the anchorage 120. This is necessary to allow for the tolerance in position of the casing 130 and anchorage 120 subsequent to fitting of the casing 130. The casing loading ring 150 may be profiled to maintain the existing outer shape of the 14 mm joint, and also provides the lock nut action to the casing 130 via the seal ring 140. To achieve this locking action, it is important that the sharp leading edges 265, 267 are fully embedded into the seal ring 140.

1. Effect of Cable Tension on Seal

The cable tension is transferred from the strand termination through the anchorage 120 and then to the casing 130, via the M70×2 thread form (threaded joint 133). During assembly the casing loading ring 150 is tightened so that the threaded joint 133 is in tension. Therefore, when a load is applied to the cable 110 there will be no free play in the threaded joint 133, and so the anchorage 120 and casing 130 strain together. Further, the pre-load applied to the sharp leading edge 265 will not be influenced by the application of cable tension, as the seal ring 140 is not included in the load transfer path.

2. Effect of Hydrostatic Pressure on Seal

The application of hydrostatic pressure will increase the compressive load on the sharp leading edge 265, whereas the compressive load on the sharp leading edge 267 will be unaffected. The increase in the stress in the seal ring 140 over the sharp leading edge 265 depends upon the relative spring rates of the casing 130, anchorage 120, casing loading ring 150, and the various threads and other components comprising to joint 100. The determination of these interactions does not lend itself to simple stress calculations and requires modeling by finite element analysis (FEA).

However, a finite element analysis can be avoided by considering the following worst case scenarios which can be used to identify the material requirements. If the thread between the anchorage 120 and the casing 130 did not exist, then the full hydrostatic end load would have to be carried by the internal thread 151 of the casing loading ring 150. The shear areas for internal and external threads are given by Equations 1 and 2, respectively:

$$A_o = \pi n L K_n \left( \frac{1}{2n} + 0.6(E_s - K_n) \right) \quad (1)$$

$$A_n = \pi n L D_s \left( \frac{1}{2n} + 0.6(D_s - E_n) \right) \quad (2)$$

where, for an M50×1.5 6H/6g male/female thread:
n=pitch (1.5 mm)
$K_n$=maximum minor diameter of internal thread (48.67 mm)
$E_s$=minimum effective diameter of external thread for fit of thread selected (48.83 mm)
$D_s$=minimum major diameter of external thread (49.73 mm)
$E_n$=maximum effective diameter of internal thread (49.24 mm)
L=engagement length (10 mm)

Therefore, the shear areas of the external and internal M50×1.5 threads comprising the casing loading ring threaded joint 134b are 985 and 1470 mm² respectively.

The hydrostatic end load, assuming a 7 km service depth, is given by:

$$W = \frac{\pi D^2 P}{4} \quad (3)$$

where: D=diameter of the casing 130 (84 mm)
P=hydrostatic pressure (70 MPa)

Thus W=388 kN. Therefore, the shear stresses acting on the external and internal thread forms comprising the casing loading ring threaded joint 134b are 394 and 264 Nmm$^{-2}$ respectively. Thus to prevent yield in shear, the yield stress of the casing loading ring 150 and anchorage 120 must be greater than 400 Nmm$^{-2}$ and the tensile yield stress must be ~800 Nmm$^{-2}$.

The material specified for a prior art 14 mm anchorage 20, casing 12 and loading ring 38 is Z6 CND 16-04-01 (AFNOR). The mechanical properties for this material are not known and thus the safety factors cannot be determined. A suitable material for these components is BS 970 431S29 (U.S. equivalent SAE/AISI 431) which is a heat treatable martensitic stainless steel with a yield stress of 800 MPa when hardened and tempered at 600° C. Therefore with this material, a minimum safety factor on yield of 1 results, which will be more than adequate, as we have considered a worst case scenario, and further the joint 100 cannot be "over pressurized" in service.

A similar analysis can be done for the threaded joint 133. If the total hydrostatic end load were to be transferred to the threaded joint 133, then the shear stresses for this thread (M70×2–6G/6e) would be 174 and 97 Nmm$^{-2}$ for the external and internal threads, respectively.

3. Required Load for Knife Edge Seal

Analytic determination of the compressive load as a function of depth of penetration of the sharp leading edges 265, 267 are not easily achieved. The magnitude of the load required to produce the hermetic seal can be approximated from existing data. Nor-Cal Products state that to seal Conflat® flanges larger than 70 mm diameter, the maximum torque requirement for the six fasteners is 26 ft-lbs. Six ⁵⁄₁₆–24 UNF fasteners are used in this case, and the pre-load generated by each bolt is given by:

$$W = \frac{T(2\pi r - \mu p)}{r(p + 2\pi \mu r)} \quad (4)$$

where
w=pre-load (kN)
T=torque on the bolt nut (35.26 Nm)
r=pitch radius of the nut thread (3.62 mm)
p=pitch of the nut thread (1.06 mm)
$\mu$=the coefficient of friction (0.3 for steel to steel with no lubrication)

Substituting these values into equation 4 yields a pre-load of 27.7 kN for each bolt and thus the maximum total load required to create the seal is ~180 kN. Therefore, it may be necessary to actuate the seal by means of applying an external load, with an armor press for example, to initially embed the sharp leading edges 265, 267 into the seal ring 140. The loading rings 145, 150 are then tightened to generate sufficient load to maintain hermeticity.

4. Effect of Temperature Cycling on Seal

Once the seal is made, the copper seal ring 140 is restricted from free expansion or contraction in the axial direction. Therefore, a temperature change either during service or molding will introduce thermal stresses in the seal ring 140. The thermal stresses induced within the seal ring 140 as a result of temperature cycling can be determined as follows. The cross-sectional areas of the copper seal ring 140 and its adjacent steel components are given by equations 5 and 6, respectively.

$$Ac = \frac{\pi(D^2 - d^2)}{4} \quad (5)$$

$$As = \frac{\pi d_s^2}{4} \quad (6)$$

where

D=outside diameter of the copper seal ring 140 (84 mm)
d=inside diameter of the copper seal ring 140 (51.5 mm)
$d_s$=outside diameter of steel "shaft" (anchorage 120) within seal ring 140 (50 mm)

Therefore the tensile/compression areas of the copper seal ring 140 and the steel components are 3457 mm² and 1963 mm² respectively. The thermally induced strains in the copper and the steel are the same and are given by:

$$\varepsilon = \frac{\Delta T(E_s A_s \alpha_s + E_c A_c \alpha_c)}{E_s A_s + E_c A_c} \quad (7)$$

where $\varepsilon$=compressive strain in the copper and steel
$\Delta T$=temperature change (°C.)
$E_s$=modulus of elasticity of steel (2.07×10⁵ MPa)
$E_c$=modulus of elasticity of copper (1.03×10⁵ MPa)
$\alpha_s$=coefficient of thermal expansion of steel (1.17×10⁻⁵ per °C.)
$\alpha_c$=coefficient of thermal expansion of copper (1.67×10⁻⁵ per °C.)
$A_s$=area of the steel components (1963 mm²)
$A_c$=area of the copper seal ring 140 (3457 mm²)

Substituting these values into equation 7 yields:

$$\varepsilon = 1.40 \times 10^{-5} \Delta T \quad (8)$$

The stress in the copper seal ring 140 as a function of temperature is therefore given by:

$$\sigma_g(\Delta T) = (\varepsilon - \alpha_c \Delta T) E_c = -0.278 \Delta T \quad (9)$$

Figure 9:
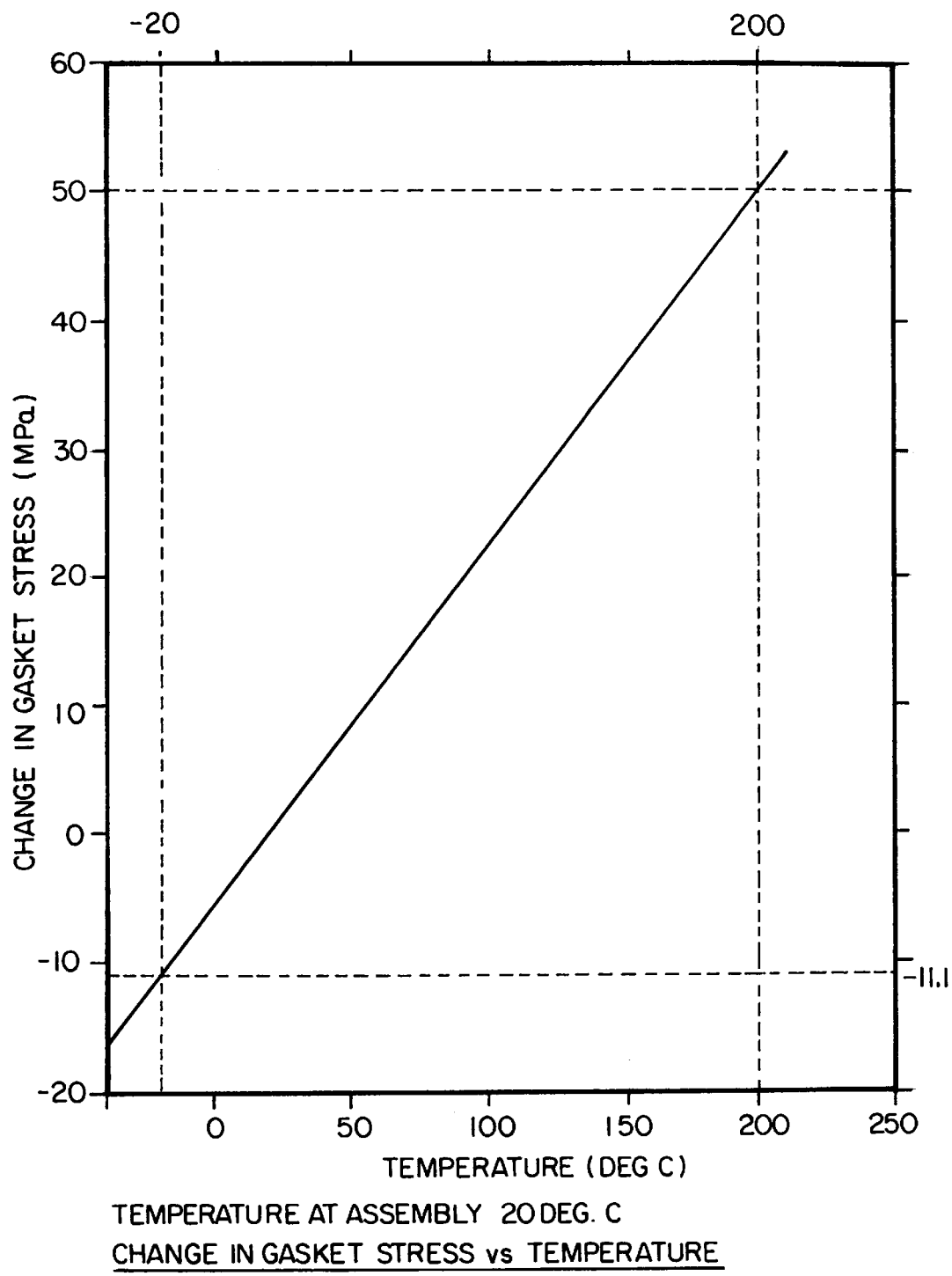
FIG. 9 is a graph of the change in gasket (seal ring 140) stress vs. temperature for an embodiment of the present invention.

If the seal is assembled at 20° C., then it is possible to predict the change in seal ring 140 stress as a function of temperature (see FIG. 9). The minimum temperature requirement for the assembly is −20° C. and this results in a decrease in the seal ring 140 stress of ~11.2 MPa from the initial stress applied at ambient temperature.

Although the present invention has been described with respect to more than one embodiment of the apparatus, it will be understood that other embodiments of the present invention may be made without departing from the spirit and scope of the present invention. Hence, the present invention is deemed limited only by the appended claims and the reasonable interpretation thereof.

What is claimed is:

1. A cable junction for connecting two optical cables (110) to be submerged underwater, comprising:
   a casing (130) having a casing sealing surface (153) which includes a circular ridge (260);
   an anchorage (120) arranged in the casing (130), and having an anchorage sealing surface (157) which includes a circular ridge (263);
   a casing loading ring (150) coupled to the anchorage (130) and having a casing loading ring sealing surface (150a);
   an anchorage loading ring (145) coupled to the anchorage (120) and having an anchorage loading ring sealing surface (145a); and
   a seal ring (140) arranged between the casing sealing surface (153) and the casing loading ring sealing surface (150a), and also arranged between the anchorage sealing surface (157) and the anchorage loading ring sealing surface (145a) for preventing hydrogen from entering the cable junction.

2. A cable junction according to claim 1, wherein the anchorage circular ridge (263) includes a sharp leading edge (267).

3. A cable junction according to claim 1, wherein the casing circular ridge (260) includes a sharp leading edge (265).

4. A cable junction according to claim 1, wherein the seal ring (140) is made of copper.

5. A cable junction according to claim 1, wherein the anchorage (120) is rotatably coupled to the casing (130) by an anchorage/casing threaded joint (133).

6. A cable junction according to claim 1, wherein the casing loading ring (150) is rotatably coupled to the anchorage (120) by a casing threaded joint (134b) for sealably compressing the seal ring (140) between the casing sealing surface (153) and the casing loading ring sealing surface (150a).

7. A cable junction according to claim 1, wherein the anchorage loading ring (145) is rotatably coupled to the anchorage (120) by a casing threaded joint (134a) for sealably compressing the seal ring (140) between the anchorage sealing surface (157) and the anchorage loading ring sealing surface (145a).

* * * * *

UNITED STATES PATENT AND TRADEMARK OFFICE
CERTIFICATE OF CORRECTION

PATENT NO : 6,028,974
DATED : February 22, 2000
INVENTOR(S): Shyu et al.

It is certified that error appears in the above-identified patent and that said Letters Patent is hereby corrected as shown below:

column 8 (claim 1), line 15, please delete "(130)" and insert --(120)--.

Signed and Sealed this

Twenty-third Day of January, 2001

Attest:

Q. TODD DICKINSON

Attesting Officer

Commissioner of Patents and Trademarks